United States Patent [19]
Peckham et al.

[11] 3,937,574
[45] Feb. 10, 1976

[54] SYSTEM AND METHOD FOR MEASURING DISTANCE

[75] Inventors: Vernon D. Peckham; Charles E. Baker, Jr.; Donald H. Bryce, all of Colorado Springs, Colo.

[73] Assignee: Kaman Sciences Corporation, Colorado Springs, Colo.

[22] Filed: Oct. 29, 1973

[21] Appl. No.: 410,346

[52] U.S. Cl. .................................. 356/4; 343/12 R
[51] Int. Cl.² .......................................... G01C 3/08
[58] Field of Search ........ 356/4; 250/205; 343/12 R

[56] References Cited
UNITED STATES PATENTS

| | | | |
|---|---|---|---|
| 2,206,036 | 7/1940 | Herson | 343/12 R |
| 3,454,772 | 7/1969 | Vitt, Jr. et al. | 356/4 |
| 3,562,785 | 2/1971 | Craig | 356/4 |
| 3,719,421 | 3/1973 | Poilleux et al. | 356/4 |
| 3,720,468 | 3/1973 | Skagerlund | 356/4 |
| 3,788,741 | 1/1974 | Buechler | 356/4 |
| 3,815,994 | 6/1974 | Peckham | 356/4 |

Primary Examiner—T. H. Tubbesing
Assistant Examiner—S. C. Buczinski
Attorney, Agent, or Firm—Max L. Wymore

[57] ABSTRACT

A pair of light intensity detectors are spaced apart in range and an arrangement is included for reflecting light from a target to the detectors. The system measures target range by dividing the output signal of one of the detectors by a signal which is a function of the difference between the output signals of the two detectors to produce a quotient signal. To avoid low signal instability problems, the difference signal is generated in one embodiment of the system by subtracting only a selected fraction of the output signal of the far detector from that of the near detector. A substantially linearized output signal representing target range is produced in this system embodiment by raising the quotient signal to a selected power. The light detectors are preferably incorporated in input circuits which are temperature compensated.

25 Claims, 8 Drawing Figures

SYSTEM AND METHOD FOR MEASURING DISTANCE

The present invention relates to an improved system and method for measuring distance to a target object.

It is a known law of physics that the intensity of light or other electromagnetic radiation from a real or apparent point source varies inversely in proportion to the square of the distance therefrom. It therefore follows that the distance to a diffusely reflecting target object should be measurable by simply detecting the intensity of a light beam of known intensity reflected therefrom.

A problem associated with this method of measuring target distance is that the accuracy of the range or distance measurement is inherently dependent on the intensity of the energy or light beam illuminating the target as well as the energy absorbing and reflecting characteristics of the target. Unfortunately, the absorption and reflection characteristics of individual targets vary, are frequently not known and oftentimes depend on the portion of target from which the beam is reflected. Additionally, unexpected and uncontrolled variations in the intensity of the illuminating beam can occur.

It is, accordingly, an object of the present invention to provide an improved system and method for measuring distance to a target object by detecting the intensity of electromagnetic radiation, such as light, reflected therefrom which is capable of producing a range measurement the accuracy of which is unaffected by variations in target absorption and reflection characteristics or by variations in illuminating beam intensity.

It is further an object of the present invention to provide an improved distance measuring system and method as set forth capable of generating accurate and reliable range measurements by substantially eliminating instability problems caused by low signal levels and noise.

It is additionally an object of the present invention to provide an improved distance measuring system and method as set forth capable of generating over a wide operating range measurements which are substantially linearly proportional to target distances.

In accomplishing these and other objects, there is provided in accordance with the present invention a system for measuring target range which includes a pair of light intensity detectors spaced apart in range. The detectors may be incorporated in input circuits which are temperature compensated. An arrangment is included in the system for generating an illuminating light beam and reflecting it from a target object to the detectors. The system measures target range by dividing the output signal of one of the detectors by a signal which is a function of the difference between the output signals of the two detectors, thereby to produce a quotient signal. To avoid low signal instability problems, the difference signal is generated in one embodiment of the system by subtracting only a selected fraction of the output signal of the far detector from that of the near detector. An output signal representing target range which is substantially linearized over a wide operating range is produced in this embodiment of the system by raising the quotient signal to a selected power.

Additional objects of the present invention reside in the specific construction of the exemplary embodiments of distance measuring system hereinafter particularly described in the specification and shown in the several drawings and their methods of operation.

Figure 1:
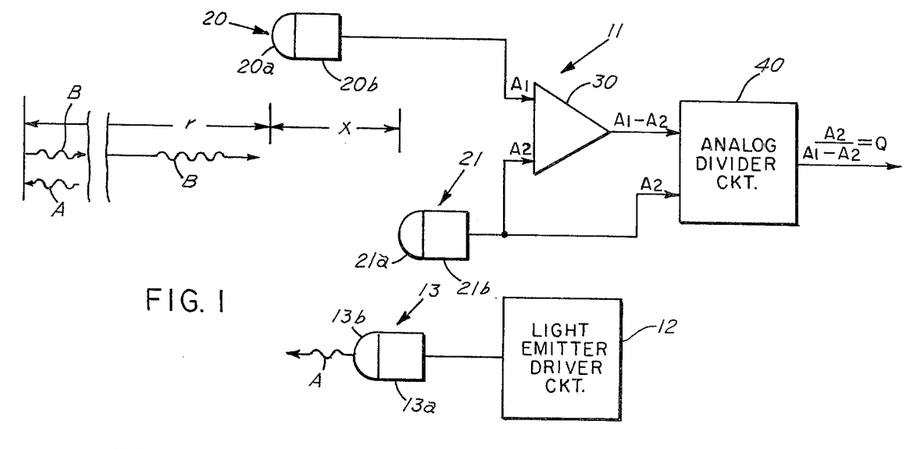
FIG. 1 is a block diagram of one embodiment of distance measuring system according to the present invention.

Referring to the drawings in more detail, there is shown in FIG. 1 an embodiment of distance measuring system generally designated by the numeral 11. The system 11 includes a source of electromagnetic energy in the form of a light source for generating a light beam A to illuminate a target T.

The light source is made up of a light emitter driver circuit 12 connected to drive a light emitter 13. The light emitter 13 includes a light emitting diode 13a and a lens 13b. The lens 13b operates to form the light beam A from the light emitted from the light emitting diode and is positioned for illuminating the target T with the beam A.

The target T isotropically reflects a fraction of the illuminating beam A. The percent of the light beam reflected depends upon the reflection and absorption characteristics of the portion of the target T reflecting the beam A. This reflected light is designated B and appears to emanate from a light source located at the point of reflection of the beam A from the target T. This apparent light source is referred to herein as the apparent target source and its intensity is designated $E_T$.

A pair of light intensity detectors 20 and 21 are included in the system 11. The detectors are positioned in as close colinear alignment with the path of the light beam B reflected from the target T as is physically possible, thereby to receive and detect the intensity of the reflected light B. The detectors 20 and 21 are shown with the optical axes orientated perpendicularly with respect to the surface of the target T from which the light B is reflected.

Error arising from lateral displacement of the detectors 20 and 21 from the target range vector defined by the center axis of light beam B is hereinafter discussed in connection with FIG. 3a. The effect on range measurement of rotation of the optical axes of the detectors 20 and 21 away from a perpendicular orientation with respect to the surface of the target T from which the light B is reflected is also considered hereinafter in connection with FIG. 3b.

The light intensity detectors 20 and 21 are each operable to generate an electrical output signal linearly proportional to the intensity of the reflected light B received at their respective locations. The detector 20 is called the near detector and is located a distance designated r from the target T. The distance r is measured along the center axis of the light beam B and is the vector of unknown length which defines target range.

The detector 21 is called the far detector since it is located more remotely from the target T than the detector 20. The detector 21 is located behind the detector 20 a predetermined known distance designated X. The distance X is measured along the center axis of the reflected beam B. Thus, the detector 21 is located the distance (r+x) from the target T.

The light intensity detector 20 is made up of a focusing lens 20a and a light intensity detecting diode 20b. The lens 20a and diode 20b are aligned along the optical axis of the detector 20. The lens 20a is appropriately positioned to focus the portion of the beam B it receives on the diode 20b and the diode 20b operates to generate an electrical output signal linearly proportional to the intensity of the portion of the beam B focused thereon. The detector 21 is constructed and operates similarly to the detector 20 being made up of a focusing lens 21a and a light intensity detecting element 21b.

The electrical output signals of the detectors 20 and 21 are designated $A_1$ and $A_2$, respectively. As beforementioned, the output signals of the detectors 20 and 21 are linearly proportional to the intensity of the light beam B sensed by the detectors 20 and 21 at their respective locations. Therefore, assuming that the detectors 20 and 21 are substantially in colinear alignment on the range vector defined by the center axis of the beam B, the output signals $A_1$ and $A_2$ may be expressed by the below equations (1) and (2) in which $E_T$ is the intensity of the apparent target source, r is the unknown range of the target T from the detector 20, and x is the known difference in range between the detectors 20 and 21.

$$(1)\ A_1 = \frac{E_T}{r^2}$$

$$(2)\ A_2 = \frac{E_T}{(r+x)^2}$$

As shown in FIG. 1, the output signals $A_1$ and $A_2$ are applied as inputs to the positive and negative input terminals of an amplifier 30. The amplifier 30 is assumed for purposes of discussion to have a unity gain factor. The amplifier 30 operates as a differential amplifier to generate an output signal $A_1 - A_2$ by linearly amplifying the difference between the signals $A_1$, $A_2$.

The difference signal $A_1 - A_2$ is applied to the denominator input terminal of a divider circuit or module 40. The numerator input terminal of the divider circuit 40 has the detector output signal $A_2$ applied thereto. The divider circuit 40 generates a quotient signal Q by dividing the numerator input by the denominator input. The quotient signal is expressed by equation (3) below and may be written as equation (4) in terms of the parameters $E_T$, r and x.

$$(3)\ Q = \frac{A_2}{A_1 - A_2}$$

$$(4)\ Q = \frac{\frac{E_T}{(r+x)^2}}{\frac{E_T}{r^2} - \frac{E_T}{(r+x)^2}}$$

Equation (4) which represents the output of the distance measuring system 11 may be written in any of the various ways hereinafter indicated in equation (5).

$$(5)\ Q = \frac{r^2}{2xr + x^2} = \frac{1}{4} \cdot \frac{\frac{(2r)^2}{x}}{1 + \frac{2r}{x}} = \frac{1}{4}\left[\frac{2r}{x} - 1 + \frac{x}{2r} - \frac{(x)^2}{2r} + \ldots\right]$$

$$= \frac{r}{2x} - \frac{1}{4} - \frac{1}{4}\sum_{n=1}^{\infty} \frac{(-x)^n}{2r} = \frac{1}{\frac{2x}{r} + \frac{x^2}{r^2}}$$

An examination of equation (5) reveals that the system output Q is independent of both the reflection and absorption characteristics of the target T and the intensity $E_T$ of the reflected beam B. Further, it is apparent that as the value of r/x increases, the nonlinear components of Q, which all vary as a function of $r^{-n}$, decrease in value with the result that the linear dependence of Q on r is increased.

The linear component of the output Q is designated V and may be written as shown below in equation (6). The component V is linearly proportional to the unknown distance r to the target T and is thus a linear measure of target range. The nonlinear error component of the output signal Q is designated e and may be written as a percent of the value of the linear components V as shown in equation (7). The nonlinear error e represents the deviation of the system output Q from the linearly proportional target range measurement given by the component V.

$$(6)\ V = \frac{r}{2x} - \frac{1}{4}$$

$$(7)\ e = \frac{V - Q}{V} = \frac{1}{1 - \left(\frac{2r}{x}\right)^2}$$

Figure 2:
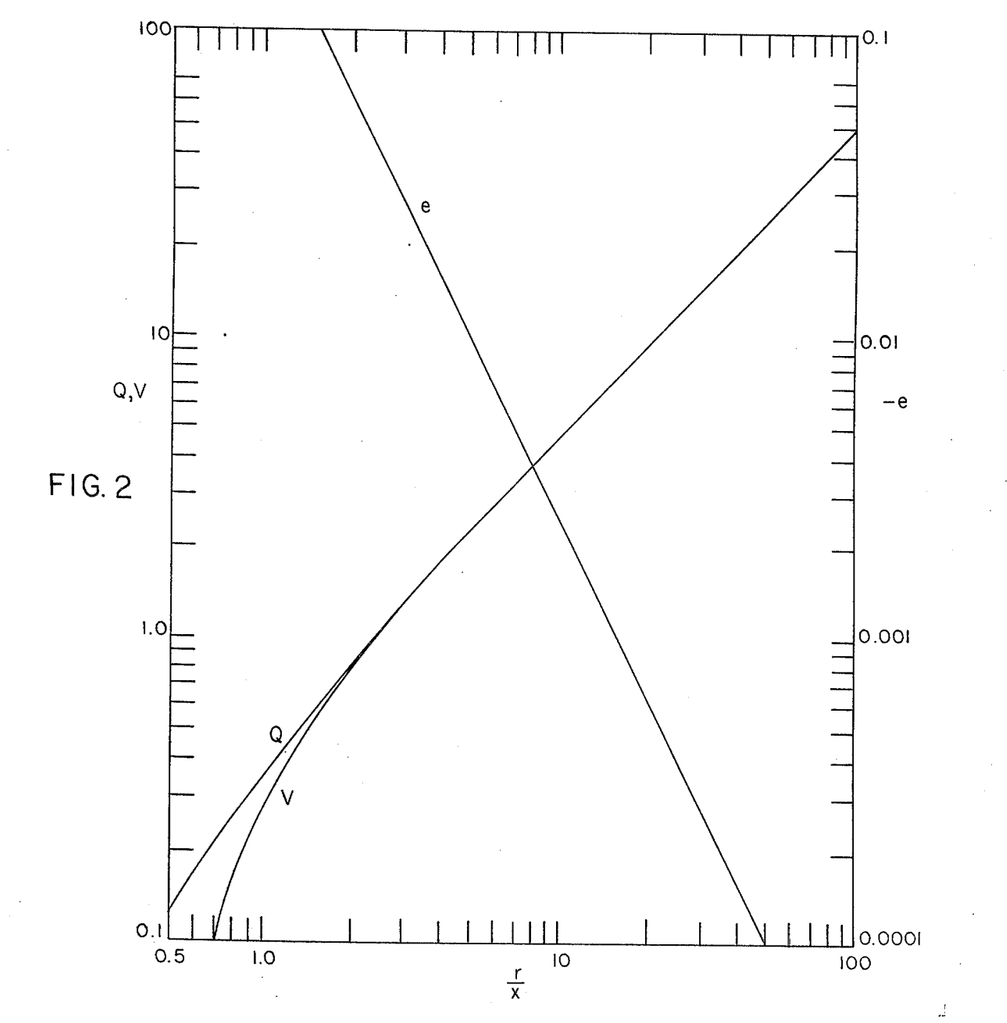
FIG. 2 is graphical illustration of the operating characteristics of the distance measuring system of FIG. 1.

The values of Q, V and e expressed as a function of the parameter r/x are illustrated in the graph of system operating characteristics plotted in FIG. 2. As there shown, the system output Q asymptotically approaches the value of the linear component V as r/x increases so as to provide in a selected operating range a measurement which is substantially linearly proportional to target range. Thereby, an embodiment of distance measuring system is provided operable to generate an output substantially linearly proportional to target range which employs only linear operators to process the input signals generated by the light intensity detectors 20 and 21.

The range of linear operation of the distance measuring system 11 has a lower range value limit but no upper range limit. The lower range limit of the system 11 is set by the selection of the distance or spacing $x$ between the detectors 20 and 21. To establish the desired distance $x$, the minimum value of range r to be measured and the maximum acceptable error e are determined. For example, if it is desired to construct a system 11 having a maximum error e of one percent and a minimum range of two units, the error curve e of the graph of FIG. 2 indicates that the value of the paramter $r/x$ must be slightly larger than five. Thus, the distance measuring system 11 should be constructed with a spacing $x$ of approximately 0.4 units between the detectors 20 and 21.

It is noted that while the output signal $A_2$ of the detector 21 was used in the system 11 above discussed as the numerator input to the divider circuit 40 that the output $A_1$ of the detector 20 could be used instead. If the signal $A_1$ were used for the numerator input of the divider 40, the system output Q would be changed or offset by a constant value which could be easily compensated for if necessary.

As earlier mentioned, the foregoing discussion has assumed that the light detectors 20 and 21 are colinearly aligned with the range vector r defined by the center axis of the reflected beam B. A physically relizable system, however, generally requires that the detectors 20 and 21 be laterally displaced from the range vector r so that one detector does not mask the other.

Figures 3A, 3B, 4:
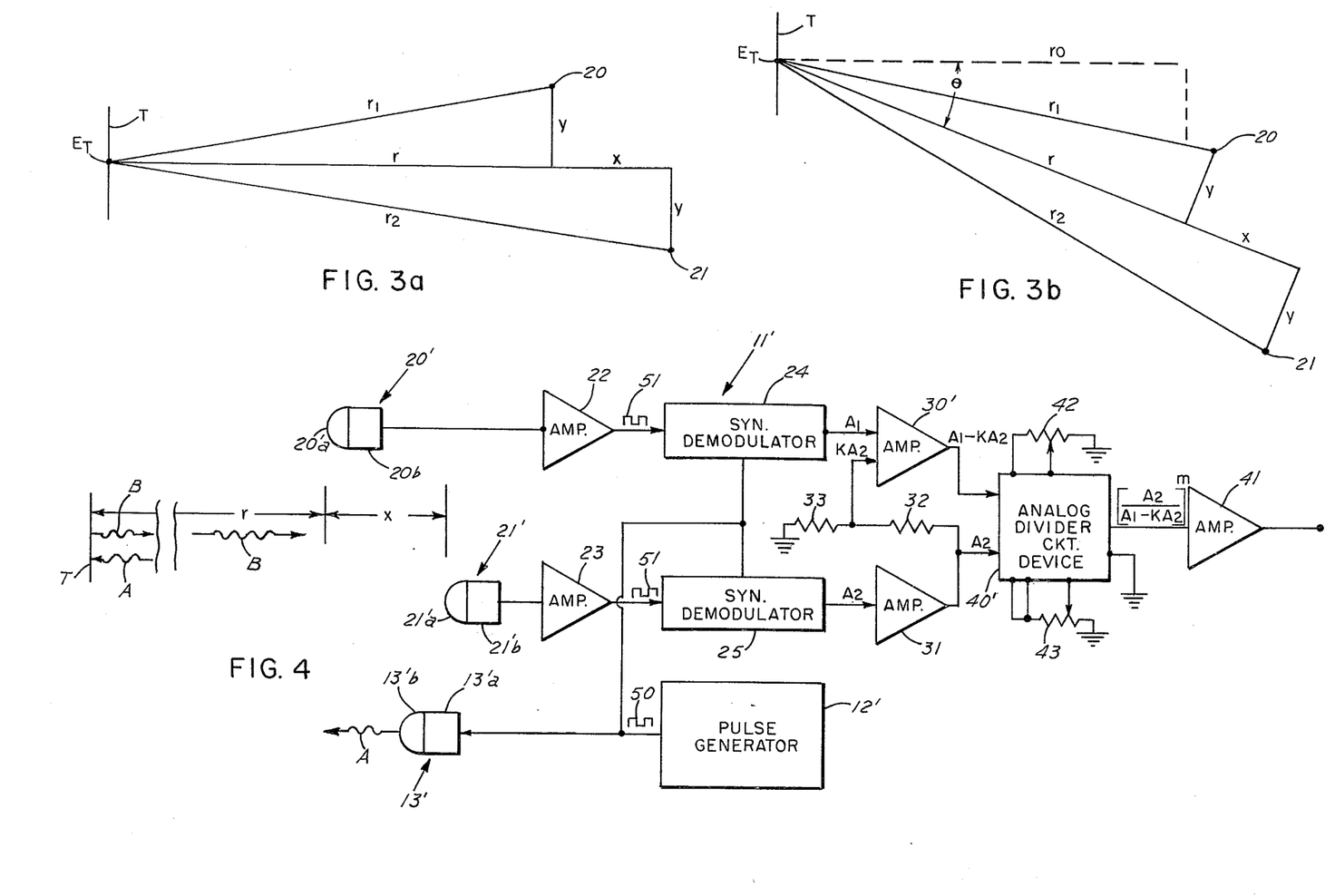
FIGS. 3a and 3b are diagrams which illustrate different relative positioning of the light intensity detectors of the distance measuring system of FIG. 1 with respect to the axis of the reflected beam along which target range is measured and the target surface from which the beam is reflected.
FIG. 4 is a block diagram of another embodiment of distance measuring system according to the present invention.

FIG. 3a illustrates the case in which the detectors 20 and 21 are laterally displaced an equal distance y from the range vector r. The detectors 20 and 21 are there illustrated by the points designated, respectively, 20 and 21. The straight line distances from the detectors 20 and 21 to the apparent target source $E_T$ are identified, respectively, as $r_1$ and $r_2$.

The distances $r_1$ and $r_2$ are given by the below equations (8), (9) and the detector output signals are given by equations (10), (11).

$$(8)\ r_1^2 = r^2 + y^2$$
$$(9)\ r_2^2 = (r+x)^2 + y^2$$

$$(10)\ A_1 = \frac{E_T}{r1^2}$$

$$(11)\ A_2 = \frac{E_T}{r2^2}$$

The output of the distance measuring system 11 with the light detectors 20 and 21 laterally displaced from the range vector r as shown in FIG. 3a is designated Qy and is given below in equation (12).

$$(12)\ Q_y = \frac{A_2}{A_1 - A_2} = \frac{r^2+y^2}{(r+x)^2-r^2} = \left(1 + \frac{y^2}{r^2}\right) Q$$

An examination of equation (12) reveals this lateral displacement error decreases as a function $y/r$. Accordingly, this error in the system output can be controlled and essentially eliminated by making the ratio of $y/r$ as small a value as possible.

FIG. 3b illustrates the situation where the optical axes of the light detectors 20 and 21 in the distance measuring system 11 are orientated an angle $\theta$ from the line $r_o$. The line $r_o$ is a normal to the surface of the target T drawn at the point of location of the apparent target source $E_T$. The line $r_o$ has a length equal to r cos $\theta$ and its direction defines the direction of the transmission of the beam B reflected towards the detectors 20, 21.

If the lateral displacement of the light detectors 20 and 21 from the range vector r is zero, the output of the system 11 approaches in its linear range of operation the value $Q_\theta$ expressed below in equation (13). $Q_\theta$ denotes the system output as a function of the angle $\theta$ when the detectors are colinear.

$$(13)\ Q_\theta = \frac{r_o}{2x\cos\Theta} - \frac{1}{4}$$

An examination of the equation (13) indicates that the system output $Q_\theta$ is linearly proportional to both r and $r_o$. With the system 11 set on a selected scale to provide an output which is a direct measure of the distance r, its output has to be multiplied by cos $\theta$ in order to convert it into a reading on the same scale which represents the distance $r_o$.

When the detectors 20 and 21 are not colinear but are laterally displaced by the distance y, as shown in FIG. 3b, the output of the system 11 becomes $Q_{x\theta}$. The output $Q_{x\theta}$ is expressed below in equation (14) as a function of $Q_\theta$.

$$(14)\ Q_{x\theta} = \left(1 + \frac{y^2\cos^2\Theta}{ro^2}\right) Q_\theta$$

Reference to equation (14) indicates that the difference between $Q_{x\theta}$ and $Q_\theta$ is a maximum when $\theta$ is zero and decreases rapidly as $\theta$ increases. Further, this difference which represents a combination of orientation and displacement error may be substantially eliminated by making the ratio $y/r_o$ as small as possible.

A drawback with the embodiment of distance measuring system designated 11 is apparent from an examination of equation 3. Equation 3 is here again set out for convenience.

$$(3)\ Q = \frac{A_2}{A_1 - A_2}$$

As the measured range r increases the difference between the detector output signals $A_1$, $A_2$ decreases with the result that the denominator $A_1 - A_2$ of equation (3) appproaches zero as r increases, becoming very small relative to the numerator $A_2$. Consequently, a limit must be placed on the minimum value of the denominator term $A_1-A_2$ in order to avoid system instability due to intrinsic noise. Otherwise, the output Q of the system 11 would become unreliable whenever the level of noise in the system became of significant magnitude relative to the magnitude of the difference signal $A_1-A_2$.

Placement of a limit on the minimum value of the difference signal $A_1-A_2$ is undesirable since it restricts the useful range of operation of the distance measuring system. Accordingly, another embodiment of distance measuring system which avoids low signal difficulties by subtracting only a fraction of the smallest light intensity signal, i.e., $A_2$, from the largest light intensity signal, i.e., $A_1$, is hereinafter described in connection with FIGS. 4–7. This second embodiment of distance measuring system is designated 11'. Components of the distance measuring system 11' corresponding to components in the system 11 are referred to by the same designation with a prime added. The light beams A,B;

target T; and output signals $A_1$, $A_2$ are referred to in the system 11' by the same designations used in the system 11 since this terminology is used in the equations hereinbefore and hereinafter set out.

Referring to FIG. 4, the distance measuring system 11' is made up of a pulse generator 12'; light emitter 13'; light intensity detectors 20', 21'; amplification channels 22, 23; synchronous demodulators 24, 25; amplifiers 30', 31; voltage divider made up of resistors 32, 33; analog device 40'; and amplifier 41. The light emitter 13' is made up of a light emitting diode 13a' and lens 13b'. The light detectors 20', 21' are made up, respectively, of focusing lenses 20a', 21a' and light intensity detecting diodes 20b', 21b'.

In operation of the system 11', pulses, identified in FIG. 4 by the numeral 50, are generated at a selected pulse repetition rate by the pulse generator 12'. The pulses 50 may be negative fifteen volt pulses of approximately 5 microsecond durations and a suitable pulse repetition rate is approximately 1 $KH_z$. The pulses 50 are supplied as a driving signal to the light emitter 13' and as synchronizing signals to the synchronous demodulators 24 and 25.

The light emitting diode 13a' is driven by the pulses 50 and is operable to generate light pulses, which are preferably infrared, in time correspondence with the driving pulses 50. Thereby, an illuminating beam A is generated by the light emitter 13' which is made up of a series of pulses in time synchronization with the pulses 50.

The target T whose range is to be determined is illuminated by the beam A. The target T reflects a fraction of the illuminating beam A, thereby a reflected beam B made up of a series of pulses in time synchronization with the pulses 50 is produced which appears to emanate from a source located at the point of reflection of the beam A from the target T.

The intensity of the reflected beam B is detected at two locations spaced apart in range by the near and far detectors 20' and 21'. The light intensity detecting diodes 20b' and 21b' in the detectors 20' and 21' are infrared photosensitive diodes which are preferably of the guard ring type of construction and are reverse biased. Photocurrents in the form of current pulses proportional to the intensity of the pulses of the detected beam B are developed by the diodes 20b', 21b'; linearly amplified by the amplification channels 22, 23; and transmitted as voltage signals to the demodulators 24, 25. As illustrated in FIG. 4, these voltage signals are made up of light intensity pulses 51 which are in time synchronization with the synchronizing pulses 50.

Figure 6:
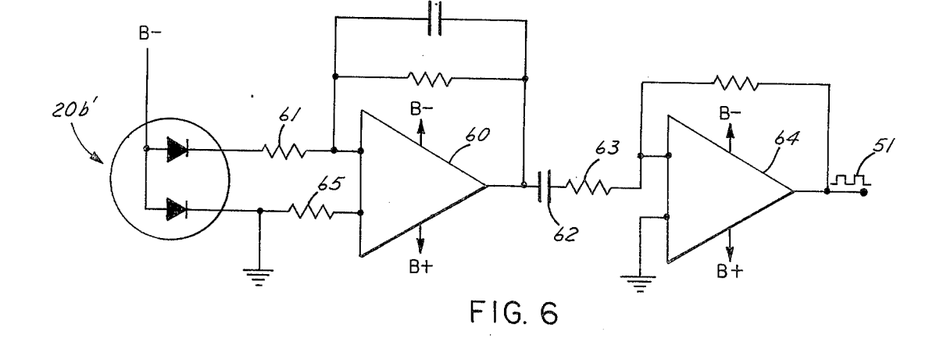
FIG. 6 is a circuit diagram of one of the light intensity detecting channels of the distance measuring system shown in FIG. 4.

The amplification channel 22 associated with the diodes 20b' is shown in FIG. 6. The circuitry shown in FIG. 6 is supplied with B+, B− and ground bias voltages which may, respectively, be +15, 0 and −15 volts. The photocurrent pulses developed by the pair of diodes 20b' are applied to an operational amplifier 60 through resistor 61. The amplifier 60 is a high speed amplifier, such as a HA 2505-5 Harris Semiconductor type, and converts the photocurrent pulses into an output of linearly proportional voltage pulses. These voltage pulses are coupled by capacitor 62 and resistor 63 to a second stage of high speed amplification provided by the operational amplifier 64. The output of the amplifier 64 is the light intensity pulses 51 and is transmitted to the demodulator 24. It is noted that the amplification channel 23 and its associated light detecting diode arrangement 21b' are constructed and operate in the same manner as the above-described channel 22 and diode arrangement 20b'.

The pulsed voltage signals 51 generated by the amplification channels 22 and 23 are supplied to the synchronous demodulators 24 and 25. The demodulators 24 and 25 demodulate these voltage pulses 51 in synchronization with the pulses 50 and generate therefrom the output signals $A_1$ and $A_2$, respectively, which are linearly proportional to the intensity of the beam B detected by the detectors 20' and 21'.

Figure 7:
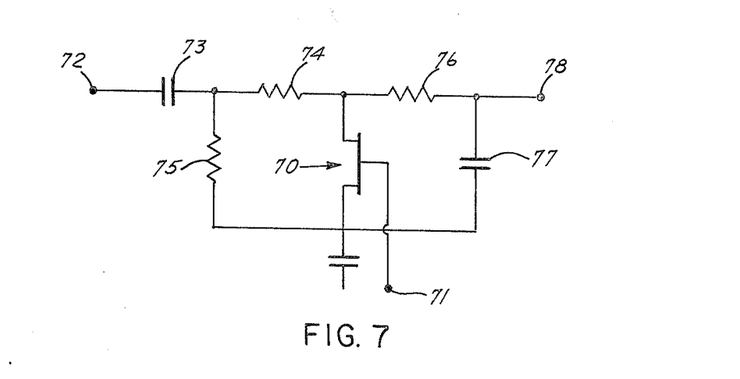
FIG. 7 is a circuit diagram of one of the synchronous demodulators of the distance measuring system shown in FIG. 4.

The demodulators 24 and 25 operate in an identical manner and a preferred form of their construction is illustrated in FIG. 7. The demodulator of FIG. 7 has a field effect transistor (FET) 70 which is gated on by each synchronizing pulse 50. The pulses 50 are applied through terminal 71 to the gate electrode of the FET 70.

The demodulator of FIG. 7 receives the light intensity pulses 51 on input terminal 72. Since the light intensity pulses 51 are in synchronization with the synchronizing pulses 50, capacitor 73 charges through resistor 74 to a voltage which closely follows the value of the light intensity pulse 51 being simultaneously received whenever the FET 70 is gated on by the pulses 50.

At the end of each synchronizing pulse 50, the FET 70 ceases to conduct. Simultaneous with the cessation of the conduction of the FET 70, the voltage level on terminal 72 drops to zero since a pulse 51 is no longer being received. As a result, the capacitor 73 discharges to ground through circuit paths defined, respectively, by resistor 75 and the combination of resistor 76 and capacitor 77. Thereby, the received light intensity pulses 51 are synchronously demodulated and DC voltages are generated on the output terminals 78 of the demodulators 24 and 25 which are linearly proportional to the intensity of the beam B detected, respectively, by the light detectors 20' and 21'. The DC voltages on the terminals 78 of the demodulators 24 and 25 are, respectively, the above-identified output signals $A_1$ and $A_2$.

It is noted that the resistor 76 capacitor 77 combination forms an RC filter in the demodulators which operates to smooth the DC voltage signals $A_1$, $A_2$ appearing on the terminals 78. The time constants provided by the components in the synchronous demodulators 24 and 25 are appropriately selected so that the voltage signals $A_1$, $A_2$ are well filtered and linearly proportional to the peak values of the light intensity pulses 51 received on the demodulator input terminals 72.

The DC voltage signals $A_1$ and $A_2$ are applied, respectively, to the amplifiers 30' and 31. The amplifiers 30', 31 are linear amplifiers, preferably of the operational amplifier type, and the signals $A_1$, $A_2$ are applied to the noninverting amplifier input terminals. For discussion purposes the amplifiers 30', 31 are assumed to have unity gain so that the designations $A_1$, $A_2$ may be used in designating their output signals without taking into account amplification factors.

A predetermined fraction or portion K of the output $A_2$ of the amplifier 31 is applied to the inverting input of the amplifier 30' by means of the voltage divider made up of the resistors 32 and 33. The fractional signal $KA_2$ is expressed below in equation (15) in which $R_{32}$ and $R_{33}$ represent the values of the resistors 32 and 33, respectively.

$$(15) \quad KA_2 = \frac{R_{33}}{R_{32}+R_{33}}$$

The amplifier 30' operates as a differential amplifier and subtracts the input $KA_2$ from its input $A_1$ to generate as its output signal the difference signal $A_1 - KA_2$.

The outputs $A_1 - KA_2$, $A_2$ of the amplifiers 30', 31 are applied to the denominator and numerator inputs, respectively, of the analog divider circuit device 40'. The analog device 40' is a multifunction module whose output is proportional to a selected power of the quotient Q of its denominator and numerator inputs. The device 40' preferably employs the logarithm-antilogarithm method of dividing and raising to a power by the use of semiconductor junctions and high gain amplifiers. The proportionality factor between the inputs may be set by adjusting the variable resistor 42, thereby the output of the device 40' may be scaled. The selected power to which the quotient Q is raised is controlled by the setting of the variable resistor 43. As hereinafter explained, the variable resistor 43 provides a system linearity control.

The quotient Q generated by the analog device 40' is given in equation (16) and its output is expressed by equation (17). In equation (17) m represents the selected power to which the quotient Q is raised.

$$(16) \quad Q = \frac{A_2}{A_1 - KA_2}$$

$$(17) \quad Q^m = \left[\frac{A_2}{A_1-KA_2}\right]^m = \left[\frac{1}{\left(1+\frac{x}{r}\right)^2 - K}\right]^m$$

Figure 5:
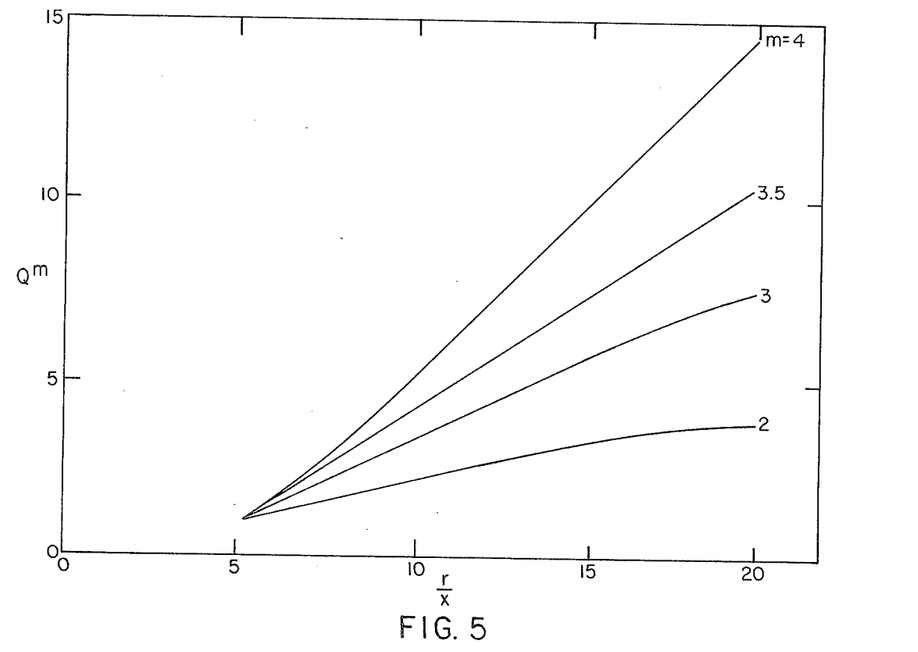
FIG. 5 is a graphical illustration of the operating characteristics of the distance measuring system of FIG. 4.

Substantial linearization of the system output $Q^m$ is obtained by raising the quotient Q to the selected power m. It may not be readily apparent from an examination of equation (17) that this linearization results. Accordingly, a graph of the system output $Q^m$ as a function of $r/x$ for selected values of m is shown in FIG. 5 to demonstrate this linearity. The curves of FIG. 5 were plotted for a value of K equal to 0.75 and for convenience, $Q^m$ has been normalized to unity for $r/x$ equals five. The limits of the values of K and m which may be practically used may be determined empirically.

A final stage of amplification in the system 11' for the system output $Q^m$ is provided by the amplifier 41. Adjustment of the amplifier 41 allows control of the system gain and zero offset.

Referring again to FIG. 6, it is noted that the photo diodes 20 b' have their anode terminals connected commonly to B- voltage and their cathode terminals connected, respectively, through the resistor 61 to one input of the operational amplifier 60 and to ground. The photo diode having its cathode terminal grounded is the guard ring. The photo diode input circuit so provided permits adjustment of the system temperature compensation characteristics by appropriate selection of the value of the resistor 61. Temperature compensation of the distance measuring system is accomplished since the position of the load lines of the photo diodes on their temperature curve characteristics depends on the value of the resistor 61.

Although the invention is shown and described in what is conceived to be the most practical and preferred embodiments, it is recognized that departures may be made therefrom within the scope of the invention.

What is claimed is:

1. A distance measuring system, comprising:
   means for generating a beam of electromagnetic energy of selected characteristics and illuminating a target therewith so that at least a fraction of said beam is reflected from said target thereby to form a reflected beam;
   first detector means for detecting the intensity of said electromagnetic energy, said first detector means being positioned to receive said reflected beam and being responsive thereto to generate a first signal the magnitude of which is directly proportional to the intensity of said reflected beam at said first detector means;
   second detector means for detecting the intensity of said electromagnetic energy, said second detector means being spaced apart in target range from said first detector means, said second detector means being positioned substantially in colinear alignment with the point on said target from which said beam is reflected and said first detector means to also receive said reflected beam, said second detector means being responsive to said reflected beam to generate a second signal the magnitude of which is proportional to the intensity of said reflected beam at said second detector means;
   means connected to receive said first and second signals for generating a difference signal the magnitude of which is a function of the difference between the magnitudes of said first and second signals; and
   means connected to receive said first signal and said difference signal for generating a quotient signal the magnitude of which is proportional to the magnitude of said first signal divided by the magnitude of said difference signal whereby the magnitude of said quotient signal is a known function and hence a measure of target range.

2. The invention defined in claim 1, wherein said beam of electromagnetic energy generated is a beam of light.

3. The invention defined in claim 1, wherein:
   said difference signal generating means is operable to generate a difference signal the magnitude of which is substantially equal to the difference between the magnitudes of said first and second signals; and,
   said quotient signal generating means is operable to generate a quotient signal the magnitude of which is linearly proportional to the magnitude of said first signal divided by the magnitude of said difference signal whereby the magnitude of said quotient signal is substantially linearly proportional to target range over a selected operating range.

4. The invention defined in claim 3, wherein said beam of electromagnetic energy generated is a beam of light.

5. The invention defined in claim 1, wherein said difference signal generating means is operable to generate a difference signal the magnitude of which is equal to the larger of said first and second signals less a predetermined percent of the magnitude of the smaller of said first and second signals.

6. The invention defined in claim 5, wherein said quotient signal generating means is operable to generate a quotient signal the magnitude of which is linearly proportional to the magnitude of said first signal divided by the magnitude of said difference signal, and including means connected to receive said quotient signal for generating a system output signal equal to the magnitude of said quotient signal raised to a selected power whereby the magnitude of said system output signal is substantially linearly proportional to target range over a selected operating range.

7. The invention defined in claim 6, wherein said beam of electromagnetic energy generated is a beam of light.

8. The invention defined in claim 6, wherein:
said beam generating means includes pulse generating means and emitter means, said emitter means being operable when excited to emit said electromagnetic energy, said pulse generator means being connected to said emitter means to drive said emitter means in a pulsed mode of operation whereby said beam generated is a series of pulses of said electromagnetic energy; and,
each of said detector means includes demodulating means for demodulating the energy pulses making up said reflected beam thereby to generate said first and second signals.

9. The invention defined in claim 8, wherein:
said pulse generating means has a selected pulse repetition rate whereby said beam generated by said emitter means is a series of said energy pulses in time synchronization with said pulse repetition rate; and,
each of said demodulating means are synchronous demodulators connected to said pulse generating means to be driven thereby in time synchronization with said pulse repetition rate whereby the energy pulses making up said reflected beam are synchronously demodulated.

10. The invention defined in claim 9, wherein said beam of electromagnetic energy generated is a beam of light.

11. The invention defined in claim 10, wherein:
said emitter means includes a light emitting diode, said pulse generator means being connected to drive said light emitting diode;
each of said detector means includes at least one light sensitive diode positioned to receive said reflected beam and being responsive thereto to generate current pulses the magnitude of which are directly proportional to the intensity of the received light pulses making up said reflected beam; and,
each of said detector means also includes circuit means connecting the output of said light sensitive diodes to the input of their associated one of said synchronous demodulators.

12. The invention defined in claim 11, wherein said light sensitive diodes are reverse biased and compensated for temperature variations by having resistors of selected magnitudes connected in series therewith thereby to control the positions of their load lines on their temperature curve characteristics.

13. The invention defined in claim 11, wherein said circuit means in each of said detector means is high speed amplifier means operable to convert said current pulses into voltage pulses linearly proportional thereto.

14. The invention defined in claim 13, wherein said light beam generated is infrared.

15. The invention defined in claim 13, wherein said light sensitive diodes are reverse biased and compensated for temperature variations by having resistors of selected magnitudes connected in series therewith thereby to control the positions of their load lines on their temperature curve characteristics.

16. The invention defined in claim 15, wherein said light beam generated is infrared and including means for adjusting the gain of said distance measuring system and its zero offset.

17. A method of measuring range to a target, comprising:
reflecting electromagnetic energy from the target;
sensing the intensity of the target reflected electromagnetic energy at first and second locations spaced apart a predetermined distance in target range, said first and second locations being substantially in colinear alignment with the point on the target from which the energy is reflected;
generating a difference signal the magnitude of which is a function of the difference between the magnitudes of the intensity of the target reflected energy at said first and second locations; and,
generating a quotient signal the magnitude of which is proportional to the magnitude of the intensity of the target reflected energy at said first location divided by the magnitude of said difference signal whereby said quotient signal is a known function and hence a measure of target range.

18. The method of claim 17, wherein error caused by lateral displacement of said first and second locations from exact colinear alignment with the point on the target from which the energy is reflected is minimized by controlling the magnitude of said lateral displacement.

19. The method of claim 17, wherein error caused by sensing the target reflected energy at an orientation out of alignment with the direction of transmission of the target reflected energy and also caused by lateral displacement of said first and second locations from exact colinear alignment with the point on the target from which the energy is reflected is minimized by controlling the magnitude of said lateral displacement.

20. The method of claim 17, wherein the electromagnetic energy is light.

21. The method of claim 17 wherein:
the magnitude of said difference signal is equal to the difference between the magnitudes of the intensity of the target reflected energy at said first and second locations; and
the magnitude of said quotient signal is linearly proportional to the magnitude of the intensity of the target reflected energy at said first location divided by the magnitude of said difference signal.

22. The method of claim 21, wherein the electromagnetic energy is light.

23. The method of claim 17, wherein the magnitude of said difference signal is equal to the one of said sensed intensities at said first and second locations which has the largest magnitude less a predetermined percent of the magnitude of the smaller of said sensed intensities.

24. A method of measuring range to a target, comprising:
reflecting electromagnetic energy from the target;
sensing the intensity of the target reflected electromagnetic energy at first and second locations spaced apart a predetermined distance in target range, said first and second locations being substantially in colinear alignment with the point on the target from which the energy is reflected;

generating a difference signal the magnitude of which is a function of the difference between the magnitudes of the intensity of the target reflected energy at said first and second locations, the magnitude of said difference signal being equal to the one of said sensed intensities at said first and second locations which has the largest magnitude less a predetermined percent of the magnitude of the smaller of said sensed intensities;

generating a quotient signal the magnitude of which is linearly proportional to the magnitude of the intensity of the target reflected energy at said first location divided by the magnitude of said difference signal whereby said quotient signal is a known function and hence a measure of target range; and, generating an output signal equal to the magnitude of said quotient signal raised to a selected power whereby the magnitude of said output signal is substantially linearly proportional to target range over a selected range of values of target range.

25. The method of claim 24 wherein the electromagnetic energy is light.

* * * * *